(12) United States Patent
Cordier et al.

(10) Patent No.: US 6,607,168 B1
(45) Date of Patent: Aug. 19, 2003

(54) BEARING STRUCTURE WITH REDUCED TIP VORTEX

(75) Inventors: Stéphane Cordier, Rouen (FR); Laurence Briancon-Marjollet, Mantes la Jolie (FR)

(73) Assignees: Geco AS (NO); Francais, Etat (FR)

( * ) Notice: Subject to any disclaimer, the term of this patent is extended or adjusted under 35 U.S.C. 154(b) by 0 days.

(21) Appl. No.: 09/787,273

(22) PCT Filed: Sep. 24, 1999

(86) PCT No.: PCT/FR99/02272

§ 371 (c)(1),
(2), (4) Date: May 16, 2001

(87) PCT Pub. No.: WO00/18641

PCT Pub. Date: Apr. 6, 2000

(30) Foreign Application Priority Data

Sep. 25, 1998 (FR) .............................. 98 12001

(51) Int. Cl.[7] ................................ B64C 5/08
(52) U.S. Cl. ....................................... 244/199
(58) Field of Search ................... 244/199, 130, 244/198, 200

(56) References Cited

U.S. PATENT DOCUMENTS

| 2,743,888 | A | * | 5/1956 | Lippisch |
| 3,411,738 | A | * | 11/1968 | Sargent |
| 4,671,473 | A | * | 6/1987 | Goodson |
| 5,322,246 | A | * | 6/1994 | Henne et al. |
| 5,357,892 | A | | 10/1994 | Vatne et al. |
| 5,492,289 | A | | 2/1996 | Nosenchuck et al. |
| 5,533,865 | A | * | 7/1996 | Dassen et al. |
| 5,848,769 | A | * | 12/1998 | Fronek et al. |
| 5,871,174 | A | * | 2/1999 | Hannay |
| 5,992,793 | A | * | 11/1999 | Perry et al. |
| 6,345,791 | B1 | * | 2/2002 | McClure |

FOREIGN PATENT DOCUMENTS

| CH | 129164 | * | 3/1926 | ................. 244/200 |
| DE | 2149956 | * | 4/1973 | ................. 244/199 |
| EP | 0782956 | | 7/1997 | |
| JP | 04314693 | | 11/1992 | |

* cited by examiner

Primary Examiner—Tien Dinh
(74) Attorney, Agent, or Firm—Thelen Reid & Priest LLP; Robert E. Krebs

(57) ABSTRACT

The bearing structure such as a wing is fitted with toothed platelets (16) at its free edges to break tip vortex produced at these places by fluid pressure distribution. Vortex dissipation is accelerated, vortex remanence is considerably reduced. In the case of a deflector for a line of hydrophones (30) towed by a ship (31) to carry out seismic tests at sea, the noise disturbing the hydrophones (30) is reduced. In the case of marine applications, risks of cavitation are much reduced, particularly with regard to stabilizers or propellers. In the case of aeronautics applications, vortex remanence on take-off and on landing of planes is reduced.

8 Claims, 5 Drawing Sheets

BEARING STRUCTURE WITH REDUCED TIP VORTEX

This application is a national phase of PCT/FR99/02272 which was filed on Sep. 24, 1999, and was not published in English.

The invention relates to a structure producing lift in the flow of a fluid medium and whose tip vortex which it produces in this flow is reduced.

It may find an application in numerous fields, such as aeroplane wings and ailerons, some sea-going vehicle appendages such as fins, anti-roll bars, rudders, propeller blades, etc. and some deflectors used for acoustical tests at sea.

Tip vortex is produced at the free end of all these bearing structures and results from a movement of the fluid transverse to the direction of flow, from the high-pressure side to the low-pressure side moving round the free edge of the structure. Tip vortex generally has a small cross-section but a high rotation speed. It is very coherent, i.e. its energy is concentrated in a reduced volume; it is not particularly subject to dissipation arising from viscosity and subsists for quite a time. It is therefore found downstream of the flow far from the structure which created it, which is prejudicial to acoustic discretion if sought or if acoustic measurements are to be taken at this point; and as the speed of the vortex is even greater the nearer one gets to the centre, the low-pressure formed may reach the point of cavitation of the liquid, which intensifies the noise still further and may well erode the structure itself.

Tip vortex is found even when a transverse plate is installed at the end of the bearing structure so as to improve lift or to reduce drag by reducing the transverse flow of fluid between the high-pressure side and the low-pressure side; it then forms at the edge of the plate and moreover has significantly greater coherence than on a streamlined end of a structure such as a traditional wing.

Measures intended to reduce tip vortex have been conceived: thus the surface portion on which the vortex formed has been roughened, in the hope of increasing friction at this point and of extending the viscous core which forms in the centre of the vortex so as to increase dissipation thereby; another idea has been to carry out drilling at the tip of the structure to produce localised pressure losses; but the effectiveness of these measures remains unproven, with the result that they are not generally used.

The abstract for patent JP 04 314 693 A (published in Patent Abstracts of Japan, vol.017, no. 136 (M-1384) on Mar. 19, 1993) describes a propeller blade the end edge of which is toothed in ridges which diffuse tip vortex.

The purpose of the object of the invention is to reduce the effects of tip vortex by a more effective attack on its coherence.

The device used is placed on a free end contour of a structure for producing lift in a fluid medium subject to a flow, a structure having a main elongation direction at the end of which this contour is located; the device consists of a plurality of ridges arranged in succession in the direction of the flow and oblique to the direction of the flow, or possibly perpendicular to this direction. The ridges are installed on a plate added to the free end of the bearing structure to increase lift and approximately perpendicular to a main portion of the structure. The plate bears the free end contour, and the ridges are located on an edge of the plate extending approximately in the direction of flow and located on a low-pressure side of the fluid delimited by the main portion of the structure.

The ridges have the effect of dividing the vortex into several smaller vortices which are juxtaposed, such that they counter each other and weaken each other; moreover, turbulences will be produced at the points where the vortices appear and will have the effect of reducing their intensity.

It may therefore be assumed that risks of cavitation will be smaller and that vortex remanence downstream of the bearing structure will be reduced.

Other aspects and advantages of the invention will be described by means of the following figures, which illustrate some of its possible embodiments:

FIG. 2A shows a detail of another bearing plate of the invention;

Figure 8:
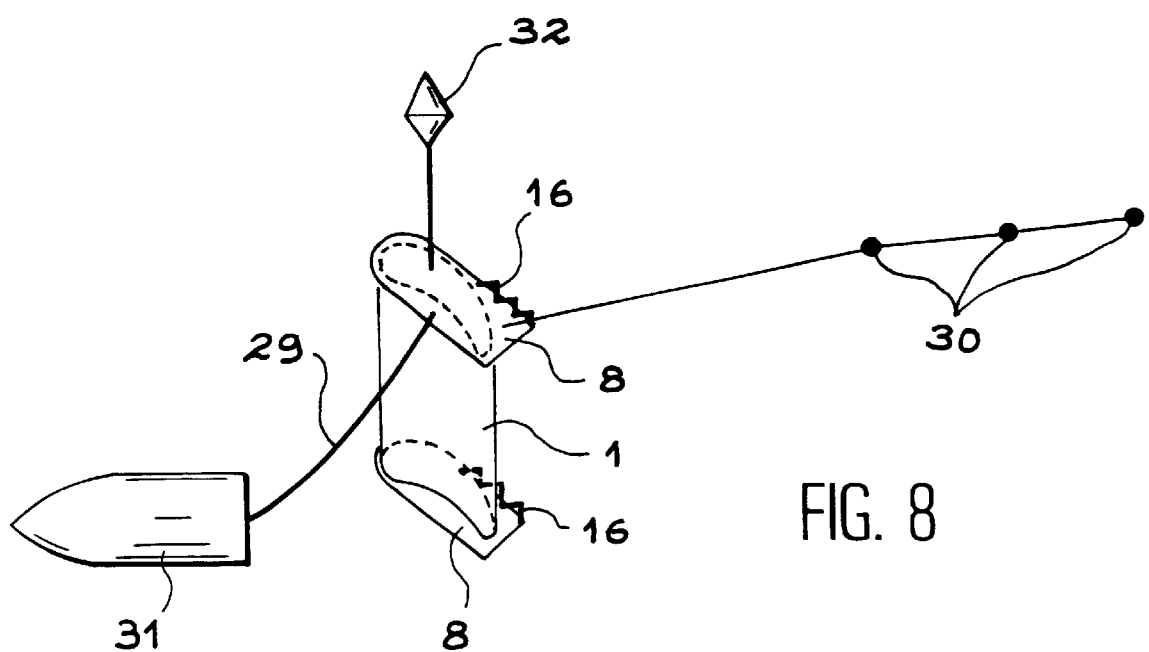
FIG. 8 shows diagrammatically the use of the invention on a towed line of hydrophones.

The structure in FIG. 1 has the general shape of a wing, although it is in reality a deflector the function of which will be described below in connection with FIG. 8. It includes a elongated body 1, delimited by a continuous casing 2 (but only partially shown on this figure so as to show the inside of the body 1) and the sides of which are curved so as to have an extrados 3, corresponding to the low-pressure side of the fluid, and an intrados 4 corresponding to its high-pressure side.

One of the ends of the body 1, preferably both, are fitted with a plate 8 intended to adjust the flow of water at the ends of the body 1 when the latter is moved. This plate extends beyond the outline of the wing in such a way as to create a flange of variable height relative to the outline. It will include an upper edge 12 and a lower edge 11.

The slightly different embodiment in FIG. 2 again includes a rib 15a between the two previous ones and a fourth 15b, placed on the opposite face and turned towards the body 1, above the extrados 3.

The essential element of the invention is an extended platelet 16 the sides of which are notched with notches 17 which give it the toothed appearance of a saw blade. The platelet 16 is welded to the plate 8 over a rectilinear portion 13 of the upper edge 12 close to the trailing edge 10 of the body 1, and its elongation direction extends as for the ribs 15 in the direction of flow of the fluid. The edges of the notches 17 include ridges 18 placed obliquely towards the attack edge 9 of the body 1.

Figure 3:
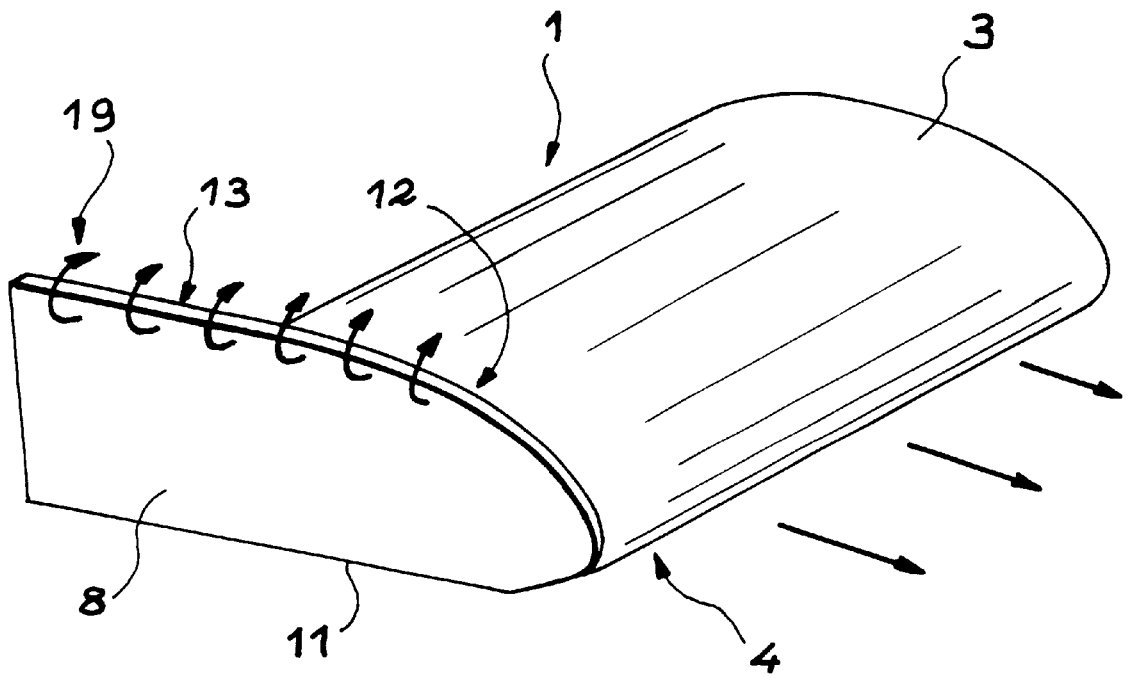
FIG. 3 shows the appearance of a tip vortex on a bearing structure not fitted with the invention.
Figure 4:
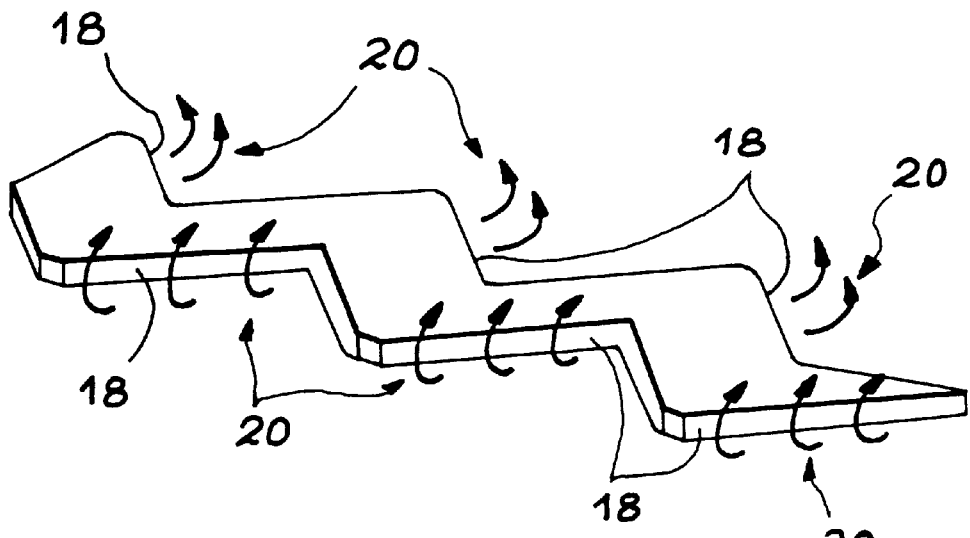
FIG. 4 shows the effect of the invention on the tip vortex.

If reference is made to FIG. 3 which shows a deflector similar to the previous one but not fitted with the platelet 16, it may be seen that a vortex 19 is formed at the points of the fluid where the deflector imposes pressure differences, i.e. essentially at the upper edge 12 of the plate 8. This vortex subsists for a long time behind the deflector as it moves. If the platelet 16 is added, FIG. 4 shows that a more reduced vortex 20 forms on each of the front facing ridges 18. In such a situation, the fluid streams common to two adjacent vortices are subject to opposite speeds which tend to cancel each other out since all the vortices 20 rotate in the same direction. The result is substantial dissipations of energy which very quickly dampen the eddying motion. Moreover, separations of the flow are produced on the ridges 18, which produces turbulences and counters the formation of vortices 20. A substantial reduction in the coherence of the vortex and the transverse speeds and an acceleration of vortex dissipation is therefore obtained.

The platelet 16 has been installed at the point where it is experimentally the most useful, i.e. on the portion of the edge of the bearing element which overlooks the extrados side 3, and more exactly near the trailing edge 10. It could conceivably be placed elsewhere, i.e. in other positions between the upper edge 12 and the lower edge 11 of the plate 8. Likewise, the notches provided on the platelet 16 may be made directly in the edges 11 and 12 of the plate 8 so as to lead to a similar result, which is shown by the plate 8A a detail of which is shown in FIG. 2A.

If the body 1 was not fitted with plate 8, the platelet 16 could nonetheless be installed near the free end contour of the body 1, at the junction of the extrados 3 and the intrados 4.

Figure 5:
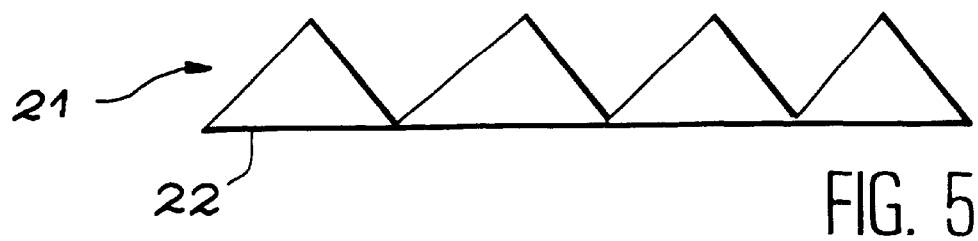
FIGS. 5, 6 and 7 show other forms of the ridge-bearing platelet.
Figure 6:
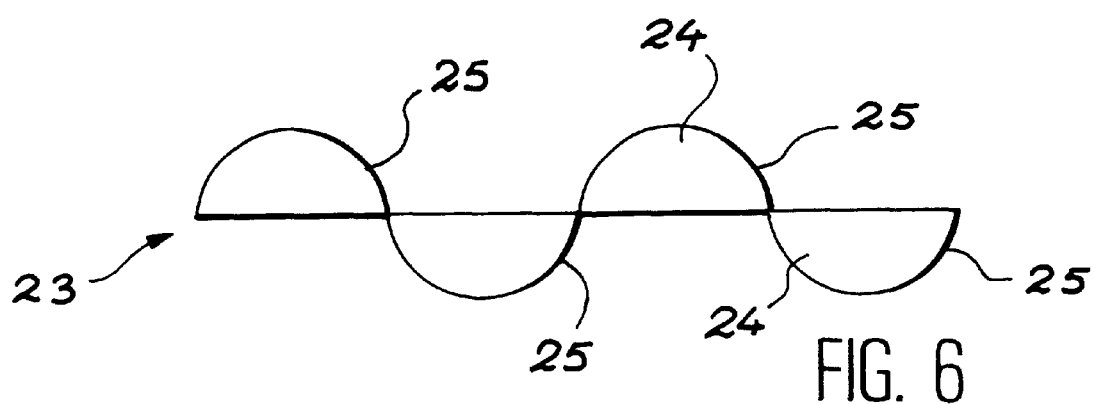
Figure 7:
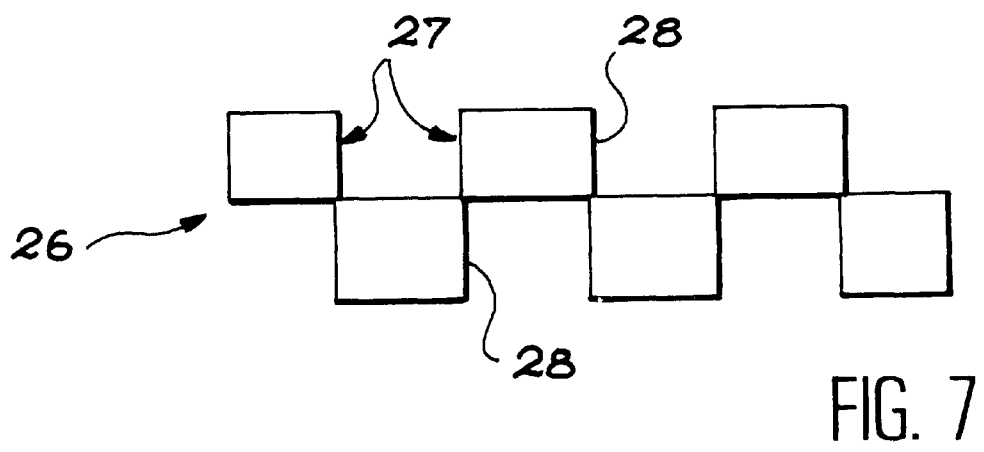

There are other possibilities for constructing the platelet 16: FIGS. 5, 6 and 7 give some examples of these. It will thus be possible (FIG. 5) to replace the saw blade shaped platelet 16 by a platelet 21 composed of triangular teeth located on a single side; its straight edge 22 would be welded to the plate 8.

FIG. 6 shows a platelet 23 the triangular teeth of which are replaced by semi-circular teeth 24 presenting curved ridges 25 to the fluid; lastly, FIG. 7 shows a platelet 26 with rectangular teeth 27 having ridges 28 perpendicular to the flow of the fluid. These platelets 23 and 26 again have a straight edge joining the two opposite rows of teeth 24 and 27, by which they can be welded to the plate 8.

The deflector in the previous figures may be placed on a line 29 of hydrophones 30 or other acoustic sensors towed by a ship 31 to take seismic measurements at sea. The deflector is placed vertically between the hydrophones 30 and the ship 31; it is immersed but kept at a constant depth by a float 32. Its purpose is to exert a lift in the lateral direction so as to deflect the line 29 sideways so that the hydrophones 30 are kept away from the wake of the ship 31. Additional details on this type of deflector may be found in U.S. Pat. No. 5,357,892. The drawback of deflectors is however that the tip vortices produced at its ends and present far downstream in their wake disturb the spatial position and the measurements of the hydrophones 30. This is why a platelet such as 16 according to the invention is added, preferably to each of the ends of the deflector.

Figure 9:
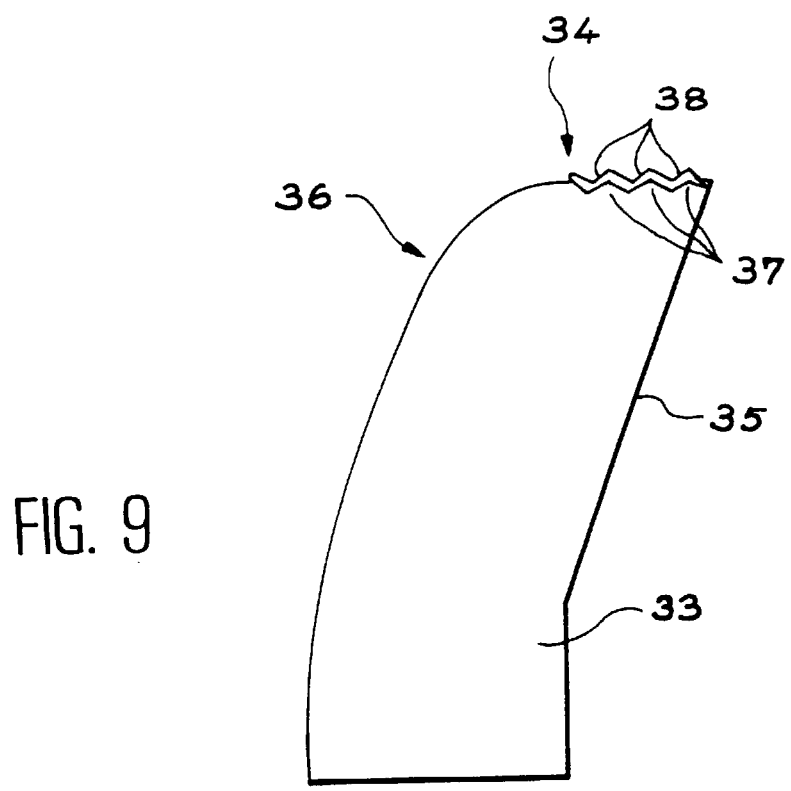
FIG. 9 shows another embodiment of the invention without an end plate which is adaptable to a wing or to a helicopter blade.

The invention may be used on bearing structures (wings or propeller) not fitted with the plate 8: FIG. 9 thus shows an aileron 33 which has simply been notched at the part 34 adjacent to the trailing edge 35 of the free end 36 so as to form triangular teeth 37 which also have ridges 38 orientated obliquely to the direction of flow. The beneficial effect of the previous embodiments is again obtained. Such an aileron 33 could also be fitted with a platelet 16, 21, 23 or 26 similar to that in the previous figures.

Figure 1:
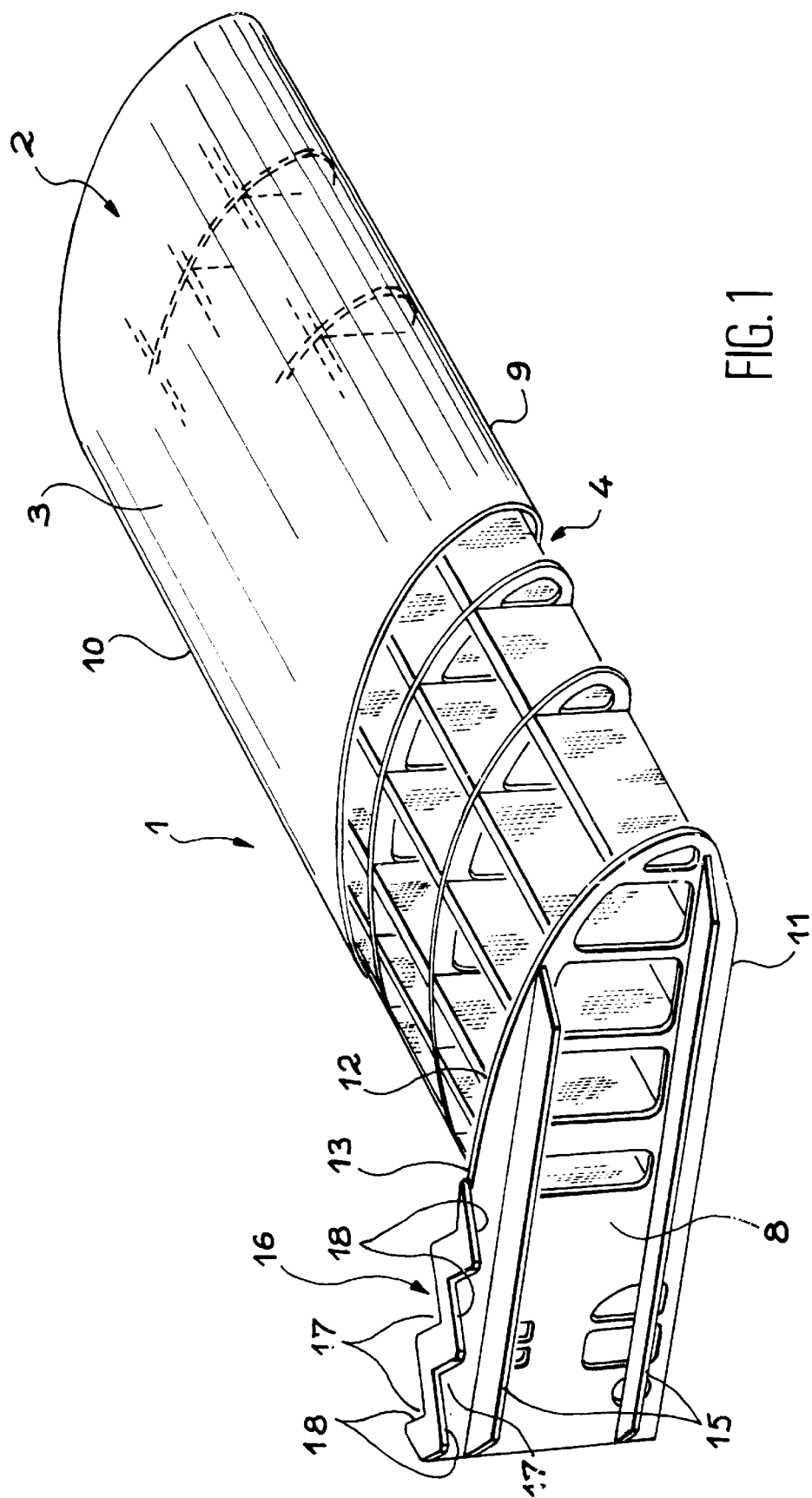
FIG. 1 is a general view of a bearing structure fitted with the invention.
Figure 2:
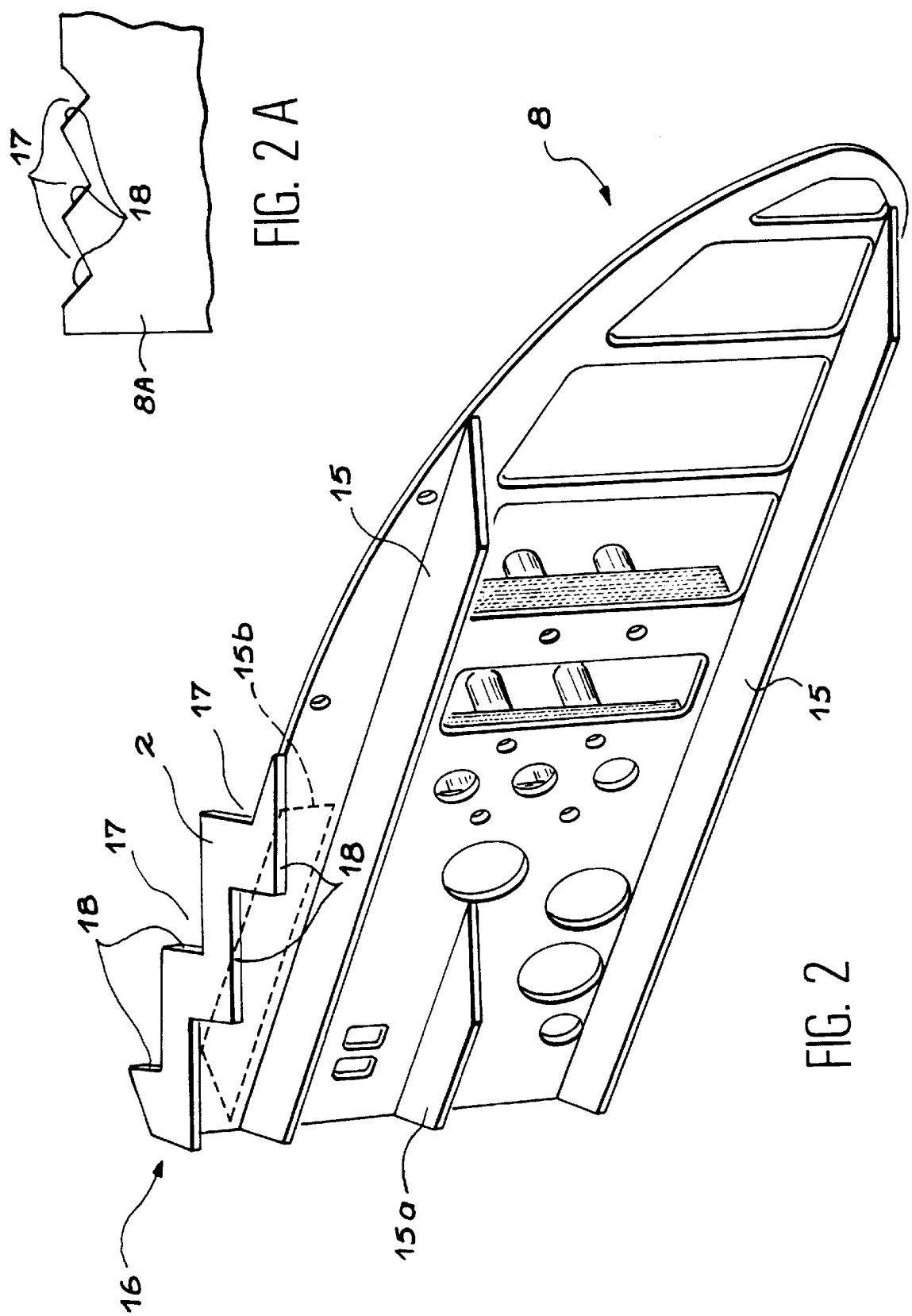
FIG. 2 shows more exactly a plate for improving lift, again fitted with the invention.

Comparing the embodiment in FIG. 9 to that in FIGS. 1 and 2, it may be seen that the ridges constituting the invention may be coplanar to the component forming the free end contour (the aileron 33) and perpendicular to this component (the plate 8). Intermediate orientations are also possible.

What is claimed is:

1. A structure for producing lift in a fluid medium subject to a flow, the structure having a main elongation direction and finishing in a free end contour (12, 36), the free end contour including a plurality of ridges (18, 25, 28, 38) arranged in succession in the direction of the flow and not parallel to the direction of the flow, characterised in that it is fitted with an end structure including a plate (8) approximately perpendicular to a main portion of the structure and which possesses the free end contour (12), and in that the ridges are located on an edge of the plate extending approximately in the direction of flow and located on a low-pressure side (3) of the fluid delimited by the main portion (1) of the structure.

2. A structure according to claim 1, characterised in that the ridges are located on a portion (13, 34) of the end contour adjacent to a trailing edge (10, 35) of the structure.

3. A structure according to claim 1, characterised in that the ridges are formed by edges of notches made in said plate.

4. A structure according to claim 1, characterised in that the ridges (18) extend on either side of the free end contour (12).

5. A structure according to claim 1, characterised in that the ridges are formed on a toothed contour of a platelet (16, 21, 23, 26).

6. A structure according to claim 1, characterised in that said structure concerns an airborne or sea-going vehicle wing.

7. A structure according to claim 1, characterised in that said structure concerns a propeller blade.

8. A structure according to claim 1, characterised in that said structure concerns a deflector hanging from a float and installed on a sea towing line (29) between a ship (31) and at least one acoustic sensor (30).

* * * * *